Figure 1A:
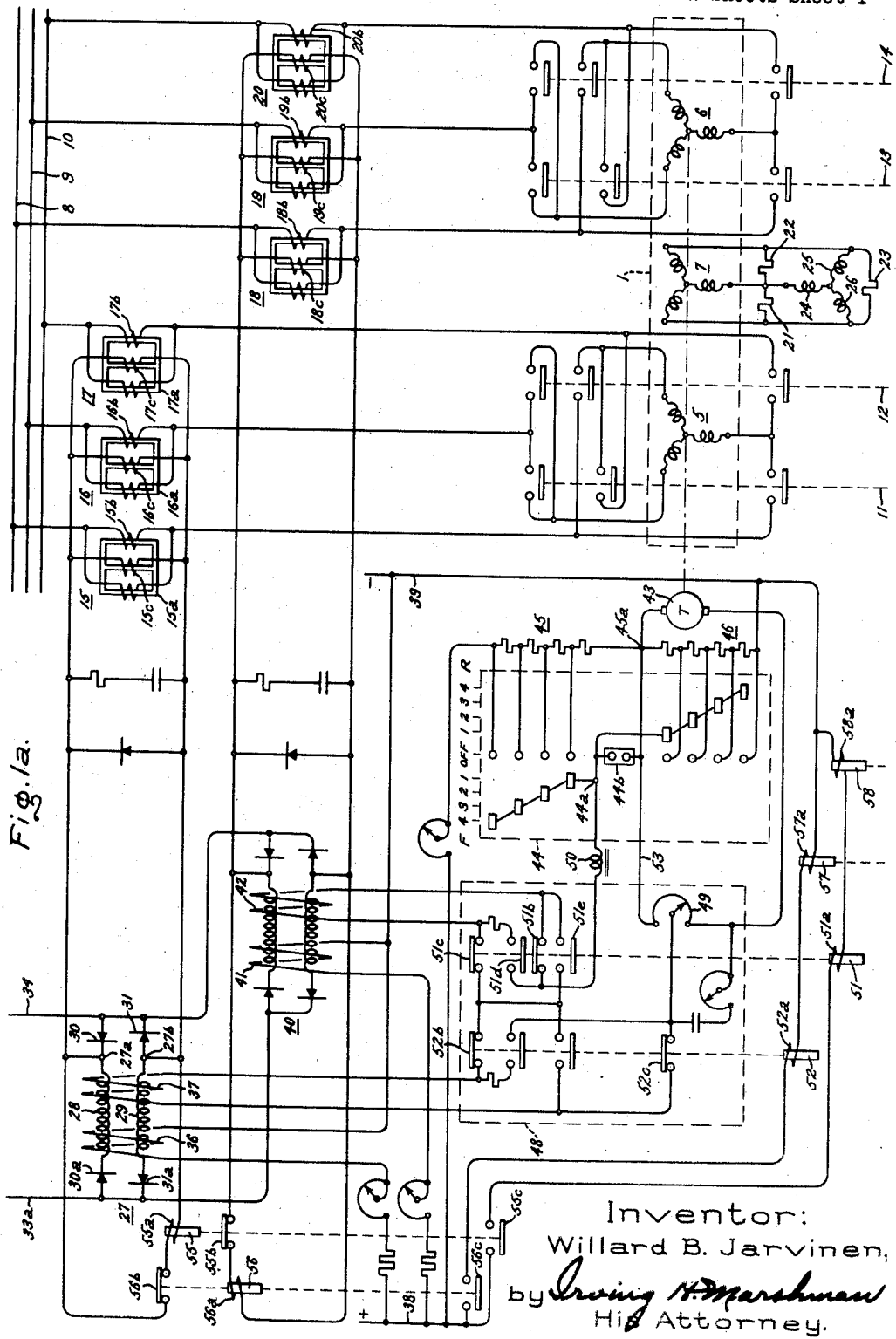

Inventor:
Willard B. Jarvinen,
by Irving H. Marshman
His Attorney.

June 9, 1959
W. B. JARVINEN
2,890,398
CONTROL SYSTEM FOR INDUCTION MOTOR
Filed Dec. 31, 1956
2 Sheets-Sheet 2
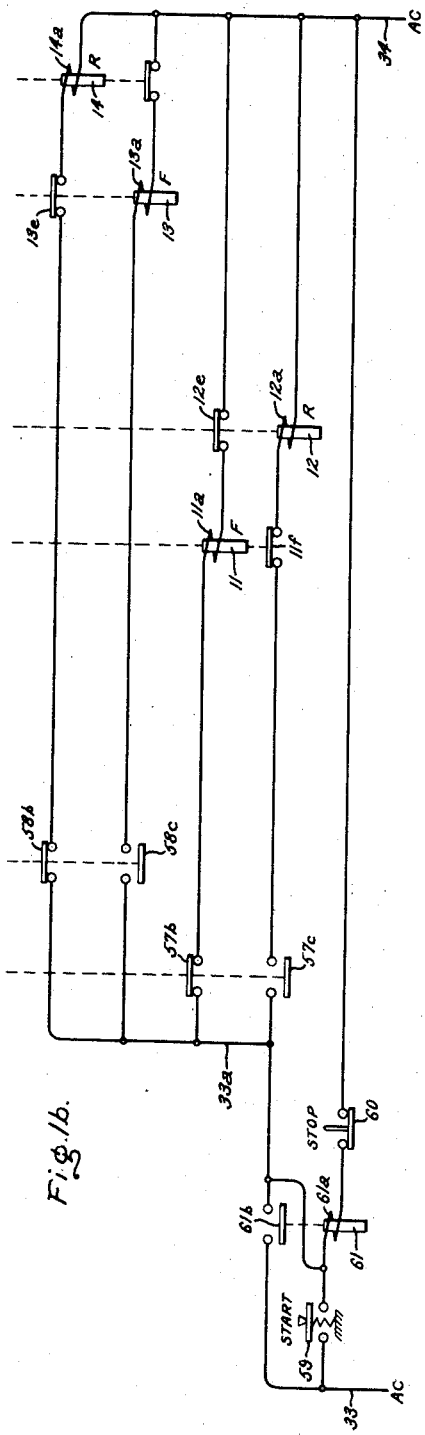
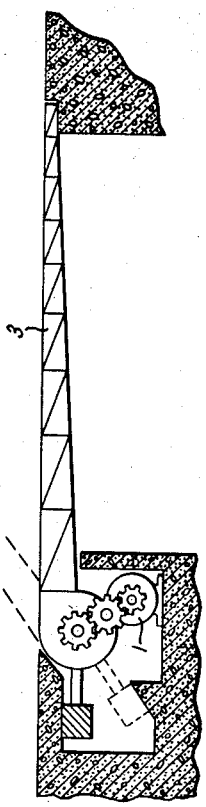
Inventor:
Willard B. Jarvinen,
by Irving H. Marshman
His Attorney.

United States Patent Office 2,890,398
Patented June 9, 1959

2,890,398
CONTROL SYSTEM FOR INDUCTION MOTOR

Willard B. Jarvinen, Roanoke, Va., assignor to General Electric Company, a corporation of New York Application December 31, 1956, Serial No. 631,560

9 Claims. (Cl. 318—225)

This invention relates to control systems, more particularly for systems for controlling the operation of induction motors, and it has for an object the provision of a simple, reliable and improved control system of this character.

More specifically, the invention relates to control systems for dual primary winding induction motors, and a further object of the invention is the provision of a control system for effecting precise and stepless speed control of a motor of this type.

Another object of the invention is the provision of a stepless and precise speed control of a dual primary winding inductor motor throughout a wide range of speed and a full range of motoring and braking torques.

A still further object of the invention is the provision of a control system for a dual primary winding induction motor in which the speed of the motor is maintained approximately constant at any preset value between 100% speed forward and 100% speed reverse throughout a full range of torques from maximum motoring torque to maximum braking torque.

In carrying the invention into effect in one form thereof there is provided an induction motor having dual primary windings. The two windings are connected to the power supply through independent sets of saturable reactors. Reversing switching means are provided for independently connecting each winding to the power supply either for forward or for reverse rotation. A master switching device provides a reference voltage of adjustable value and means are provided for deriving from the motor a control voltage which is representative of its speed. The difference of the reference voltage and the speed voltage is utilized to control the reversing switching means to control the relative directions of the torques produced by the two primary windings. It is also used to control the saturable reactors in circuit therewith to control the relative magnitudes of the two torques.

In order to illustrate the invention in an application which imposes widely varying operating conditions it is shown as embodied in a control system of an induction motor for operating a bascule bridge. Some of the control requirements for a motor to operate a bascule bridge are these:

(1) In opening the bridge the motor must start smoothly whatever the ice and snow load and accelerate to full speed in a relatively short time, e.g. five to ten seconds. The torque should be built up without shock and 200% or more of rated torque should be available to provide the required rapid acceleration.

(2) At full load torque, the motor should run at 85 to 90 percent of synchronous speed, and it should also deliver 160% torque at 75 to 80 percent speed. Normally the full speed operation may continue for about 60 seconds until the bridge has completed 85 to 90 percent of its travel.

(3) During the last 10 to 15 percent of its travel the motor should run at approximately 10% of synchronous speed so that the bridge will proceed smoothly into its fully open position and lock in without shock. During this period the leaf of the bridge presents a large area to the wind and the resulting load on the motor may exceed full load torque. To maintain the desired speed in a cross-wind, therefore, the motor driving a leaf of a bascule bridge may be required to exert 150% braking torque.

(4) To close the bridge the same procedure is followed but with the motors operating in the reverse direction.

For a better and more complete understanding of the invention reference should now be had to the following specification and to the accompanying drawings of which Figs. 1A and 1B taken together and arranged with the top edge of Fig. 1B adjacent the lower edge of Fig. 1A constitute a simple, diagrammatical sketch of an embodiment of the invention, and Fig. 2 is a simple diagrammatic sketch of a single leaf bascule bridge.

Referring now to the drawings, an induction motor 1 is employed to operate the leaf 3 of a single leaf bascule bridge between the closed position in which it is illustrated and the open position which is indicated by dotted outline.

The motor 1 is mounted in a suitable position with respect to the leaf, preferably in the counterweight pit and its drive shaft is connected through suitable reduction gearing to a rack arranged on the counterweight end of the leaf.

The motor 1 is a polyphase-wound rotor induction motor of the type having dual primary windings. As shown in Fig. 1 the motor has two identical Y-connected primary windings 5 and 6 wound to provide the same number of poles. It also has a Y-connected secondary winding 7. Voltage of suitable magnitude is supplied to the primary windings from a suitable three-phase source such as the three supply conductors 8, 9 and 10. For the purpose of controlling the directions of the torques produced by the windings 5 and 6 with respect to each other, suitable reversing switching means are included in the connections between each primary winding and the source. The reversing switching means for the primary winding 5 are illustrated as electromagnetic contactors 11 and 12 of which the contactor 11 is regarded as the forward contactor and contactor 12 as the reverse contactor. Similar forward and reverse contactors 13 and 14 respectively are included in the circuit of primary winding 6.

For the purpose of varying the magnitude of the currents supplied to the primary windings 5 and 6, suitable controllable current limiting means are provided. The current limiting means for the primary winding 5 are illustrated as three individual saturable reactors 15, 16 and 17 having magnetic core members 15a, 16a and 17a respectively upon which are mounted main load circuit reactance windings 15b, 16b and 17b and saturation control windings 15c, 16c and 17c respectively. Each of the main reactance windings 15b, 16b and 17b is illustrated as comprising two separate coils in parallel and each is connected in a different phase of the primary circuit. Similarly connected in circuit with the separate phases of primary winding 6 are the main load circuit reactance windings 18b, 19b and 20b of individual saturable reactors 18, 19 and 20 respectively.

Comprising the secondary circuit of the motor are three resistors 21, 22 and 23 connected in delta and three reactors 24, 25 and 26 connected in an independent Y. The rating of the resistors and reactors depends upon the rating of the motor. For a motor having a rated current of 153 amperes and a rated voltage per phase of 254 volts, each of the secondary resistors might appropriately have a value of .8 ohm and each of the secondary reactors might appropriately have a value of .8 ohm at 100 volts and 60 cycles.

For the purpose of varying the saturation of the reactors 15, 16 and 17 their saturation control windings are connected to be supplied from the output of a suitable magnetic amplifier 27 of which the input circuit is connected to be energized by an error voltage which is representative of the difference between the desired speed of the motor and its actual speed. The magnetic amplifier 27 is of the type generally known in the art as self-saturating. It is also known as an amplistat. As shown in Fig. 1 it comprises a pair of output circuit reactance windings 28 and 29 wound upon a magnetic core structure (not shown) and connected with rectifiers 30, 30a, 31 and 31a in a full wave rectifying bridge circuit which is supplied from a suitable source of alternating voltage such as the supply conductors 33a and 34. Diagonally opposite bridge points 27a and 27b constitute the positive and negative output terminals. For the purpose of controlling the saturation of its core, the magnetic amplifier is provided with a negative bias coil 36 and a main saturation control winding 37. To the bias coil 36 constant direct current of suitable magnitude is supplied from a suitable source such as the direct voltage supply conductors 38 and 39.

A similar magnetic amplifier 40 having a negative bias coil 41 and a main saturation control winding 42 supplies direct current of variable magnitude to the saturation control windings 18c, 19c and 20c of saturable reactors 18, 19 and 20 which are connected in the circuit of motor primary winding 6. The main saturation control windings 37 and 42 are connected to be energized by the previously mentioned error voltage.

A direct control voltage which is representative of the actual speed of the motor 1 is provided by means of a tachometer generator 43 which is mechanically coupled to the shaft of motor 1. A reference voltage of adjustable magnitude and reversible polarity which is representative of the desired speed and direction of rotation of the motor is provided by means of a reversing type master switch 44 and two potentiometers 45 and 46 controlled thereby and energized from a suitable source of direct voltage such as supply conductors 38 and 39. The potentiometers 45 and 46 are serially connected across the supply conductors 38 and 39. Preferably they have equal resistances so that the voltage at their common terminal 45a is midway between the voltages of the supply conductors.

The master switch 44 has a central off position and a plurality of forward and reverse positions for effecting forward and reverse rotation of the motor. Forward rotation raises the leaf 3 and reverse rotation lowers it. An interlock contact 44b which is normally closed in the off position of the master switch connects the output terminal 44a to the common terminal 45a. In the operating positions of the master switch the interlock contact 44b is open and the output terminal 44a is connected to different points on one or the other of the potentiometers 45 and 46 so that there is supplied to the output terminal a voltage of which the polarity and magnitude with respect to the center terminal 45a depends upon the direction and position to which the master switch is operated. The voltage between the terminal 45a and the output terminal 44a is the reference voltage.

In order to compare the actual speed of the motor with the desired speed, a voltage-comparison circuit 48 is provided to which are supplied in opposing relationship the reference voltage and a selectable portion of the terminal voltage of the tachometer generator. An adjustable rheostat 49 connected across the terminals of the tachometer generator and included in the comparison circuit provides the selectable amount of tachometer voltage which is compared with the reference voltage. Also included in the comparison circuit are the main saturation control windings 37 and 42 of magnetic amplifiers 27 and 40 respectively. The comparison circuit is readily traced from the output terminal 44a through a reactor 50, control winding 42 through normally closed contacts 51b and 51c of a reversing contactor 51, saturation control winding 37 via normally closed contacts 52b and 52c of a second reversing contactor 52, active portion of potentiometer 49 and thence by conductor 53 to the center terminal 45a.

Connected across the output terminals of magnetic amplifiers 27 and 40 are the operating coils 55a and 56a respectively, of voltage-sensitive control relays 55 and 56. Although these relays may be of any suitable type they are preferably general purpose D.-C. operated instantaneous pick-up and dropout devices having dropout voltages which are relatively low with respect to their pickup voltages. Typically they may have 40 volt pickup and 15 volt dropout. These relays have normally closed contacts 55b and 56b and normally open contacts 55c and 56c respectively. As shown, the normally closed contacts of each are connected in the operating coil circuit of the other to provide electrical interlocking.

For the purpose of controlling the energization of the reversing contactors 11 and 12 for motor primary winding 5 relay 57 is provided, and a similar relay 58 is provided for controlling the energization of reversing contactors 13 and 14 for primary winding 6. The operating coil 57a of relay 57 and the operating coil 52a of reversing contactor 52 for magnetic amplifier control winding 37 are serially connected through normally open contacts 56c across the direct voltage supply conductors 38 and 39. Similarly, the operating coil 58a of relay 58 and the operating coil 51a of reversing contactor 51 for magnetic amplifier control winding 42 are serially connected through normally open contacts 55c across the direct voltage supply conductors. Thus the relay 55 which responds to the output voltage of magnetic amplifier 27 ultimately controls the reversing contactor 51 for the control winding 42 of magnetic amplifier 40 and also the reversing contactors 13 and 14 for motor primary winding 6. Similarly, relay 56 which is responsive to the output voltage of magnetic amplifier 40 ultimately controls the reversing contactor 52 for the saturation control winding of magnetic amplifier 27 and also the reversing contactors 11 and 12 for motor primary winding 5.

For the purpose of initially energizing and deenergizing the system, a push button switch accessory and a run contactor controlled thereby are provided. The accessory is illustrated as comprising "start" and "stop" push button switches 59 and 60 having normally open and normally closed contacts respectively, serially connected in circuit with the operating coil 61a of a run contactor 61.

With the foregoing understanding of the elements and their organization, the operation of the invention will readily be understood from the following detailed description. It is assumed that the leaf of the bridge is in its fully seated position in which it is illustrated. With the master switch 44 in its central off position all relays and contactors are deenergized and their contacts are in their normal positions in which they are illustrated.

The control is energized by depressing the start switch to close its contacts and complete an energizing circuit for the operating coil 61a of run contactor 61 through normally closed contacts of the stop switch. In response to energization the run contactor picks up and seals itself in through normally open contacts 61b in parallel with the contacts of the start switch 59 which may now be released. The operating coil 11a of forward contactor 11 for primary winding 5 is now connected across alternating supply conductors 33 and 34 through the normally closed interlock contacts 12e of reverse contactor 12 and normally closed contacts 57b of relay 57 to bus 33a and thence through contacts 61b of run contactor 61 in the closed position thereof. Similarly the operating coil 14a of reverse contactor 14 for primary winding 6 is energized through normally closed interlock contacts 13e of forward contactor 13 and normally closed contacts 58b of relay 58. Responsively to energization, the main contacts of forward contactor 11 are closed to connect primary winding 5 through saturable reactors 15, 16 and 17 to the three-phase supply conductors 8, 9 and 10 for forward rotation. Likewise the main contacts of reverse contactor 14 are closed to connect primary winding 6 to supply source through saturable reactors 18, 19 and 20 for reverse rotation. As long as forward contactor 11 is picked up, its normally closed interlock contacts 11f in the circuit of operating coil 12a of the reverse contactor 12 are open and prevents its energization. Similarly, when reverse contactor 14 is energized and closed its normally closed interlock contacts in the circuit of coil 13a of forward contactor 13 are open and prevent its energization as long as reverse contactor 14 is picked up.

The negative biases produced by the bias windings 36 and 41 of magnetic amplifier 27 and 40 respectively reduce the output voltage of both amplifiers to approximately 10% of maximum. Consequently, saturable reactors 15, 16, 17, 18, 19 and 20 are relatively unsaturable and present high impedance in the circuits of primary windings 5 and 6.

As a net result of the foregoing initial operating conditions, primary winding 5 produces a very low forward torque and primary winding 6 produces an equal reverse torque. Consequently the net torque of the motor is zero and it is at standstill.

Movement of the master switch 44 to its first forward position connects output terminal 44a to a point on potentiometer 45 that is slightly positive with respect to the center terminal 45a. Simultaneously it opens normally closed contact 44b. Thus a reference voltage of relatively low value appears across output terminals 44a and 45a and is supplied to the comparison circuit 48. As a result, main saturation control winding 37 of magnetic amplifier 27 is energized in opposing relationship with respect to the negative bias coil 36 and main saturation control winding 42 of magnetic amplifier 40 is energized in additive relationship with respect to its negative bias coil 41. Consequently the output voltage of magnetic amplifier 27 is increased thereby to increase the saturation of saturable reactors 15, 16 and 17 and correspondingly reduce their reactances. Conversely the output voltage of the magnetic amplifier 40 is reduced substantially to zero thereby to increase the reactances of reactors 18, 19 and 20. The decreased reactance of reactors 15, 16 and 17 increases slightly the forward torque of primary winding 5 and increase reactances of reactors 18, 19 and 20 decreases substantially to zero the reverse torque of primary winding 6. The result is that the motor has a net forward torque of sufficient value to take up the backlash in the gearing but insufficient to accelerate the leaf 3.

On the second point forward of the master switch the output terminal 44a is connected to a point on potentiometer 45 of still more positive voltage thereby to increase the reference voltage to a higher value. This circulates more current through the saturation control windings 37 and 42 of magnetic amplifiers 27 and 40 thereby to increase the output voltage of amplifier 27 and correspondingly to increase the saturation of reactors 15, 16 and 17 and the torque produced by primary winding 5. The torque of primary winding 6 remains substantially unaltered and consequently the net torque of the motor increases to a value at which the motor starts and accelerates the leaf 3. As the motor speed rises the tachometer 43 generates a voltage which increases correspondingly. This speed voltage is supplied to the comparison circuit in opposing relation with respect to the reference voltage. The acceleration continues until a balanced condition between reference voltage and speed voltage is established.

In the event of an ice load on the leaf so heavy as to prevent acceleration of the motor the tachometer generator 43 does not supply any opposing voltage to the comparison circuit and the currents flowing in the saturation control winding 37 and 42 increase in value. This increases the output voltage of magnetic amplifier 27 to approximately 50% of maximum. In response to this increased output voltage relay 55 picks up and closes its normally open contacts 55c to complete energizing circuits for the operating coils 51a and 58a of reversing contactor 51 and relay 58. It also opens its normally closed interlock contacts 55b in circuit with operating coil 56a of voltage-sensitive relay 56.

Responsively to energization contactor 51 picks up to open its normally closed contacts 51b and 51c and to close its normally opened contacts 51d and 51e thereby to reverse the polarity of saturation control winding 42 so that it opposes the negative bias coil 41. Since it is in series relationship with saturation control coil 37 the output voltage of magnetic amplifier 40 becomes equal to the output voltage of magnetic amplifier 27, i.e. approximately 50% of maximum. Owing to the prior opening of contacts 55b in its coil circuit relay 56 cannot respond to this increased output voltage of magnetic amplifier 40 and accordingly remains deenergized. The increased output voltage of amplifier 40 increases the saturation of reactors 18, 19 and 20 thereby to increase the voltage supplied to primary winding 6 and to increase its torque to substantially the same value as the torque produced by winding 5. Simultaneously, relay 58, in response to energization, opens its normally closed contacts 58b and closes its normally opened contacts 58c thereby deenergizing and dropping out reverse contactor 14 and picking up forward contactor 13. The opening of contactor 14 and the closing of contactor 13 reverses the phase rotation of the primary winding 6 and thereby reverses the direction of its torque so that both primary windings 5 and 6 contribute relatively large substantially equal amounts of motoring torque in the forward direction to raise the leaf 3.

Operation of the master switch 44 to successively higher speed positions effects operation of the motor at correspondingly higher speeds.

Another operating condition frequently encountered is wind in a direction either to open or close the leaf. Assume in this case a wind in a direction tending to open the leaf. In this event the wind assists the motor and causes its speed to rise above the speed set by the master switch. This causes the voltage of the tachometer generator to increase and thereby to reduce the current in the main saturation control windings 37 and 42 of the magnetic amplifier 27 and 40. The net effect of this is substantially to reduce the forward motoring torques produced by both primary windings 5 and 6.

If the wind is so strong that the bridge continues to accelerate, the output voltages of both magnetic amplifiers continue to decrease and reduce the forward motoring torque of both primary windings 5 and 6. As the output voltage of amplifier 27 falls below the drop out value of voltage-sensitive relay 55, it drops out to open its normally closed contacts 55c to deenergize and drop out reversing contactor 51 and relay 58. In its dropped out position reversing contactor 51 reverses the connections of main saturation control winding 42 so that it aids the negative bias coil 41 to reduce the output voltage of amplifier 40 substantially to zero which in turn reduces the forward motoring torque of primary winding 6 to a very low value. Relay 58 in dropping out closes its normally closed contacts 58b and opens its normally open contacts 58c thereby to cause reversing contactors 13 and 14 to reverse the connections of the primary winding 6 to the source so that its torque opposes the torque of primary winding 5. Thus the net forward motoring torque of the motor is still further reduced.

In the event that the wind is so strong that it continues to accelerate the leaf until the tachometer voltage exceeds the reference voltage, the current in the comparison circuit reverses and the main saturation control coil 42 opposes the negative bias coil 41 and main saturation control winding 37 aids negative bias coil 36. This decreases the output voltage of amplifier 40 the net result of which is to decrease the forward motoring torque of primary winding 5 and to increase the reverse motoring torque of primary winding 6. Under the assumed conditions, the tachometer voltage is increasing and continues to increase the current in the main saturation control windings 37 and 42 to whatever extent may be necessary even to the extent that the reverse motoring torque of primary winding 6 becomes greater than the forward motoring torque of primary winding 5. This results in a "soft" plugging of the motor which causes it to exert a net braking torque.

If the wind causes the speed of the leaf to become appreciably greater than the reference, the output voltage of magnetic amplifier 40 will exceed the pickup value of voltage-sensing relay 56. In picking up, the relay 56 opens its normally closed interlock contacts 56b and closes its normally open contacts 56c to complete an energizing circuit for the operating coils 52a of reversing contactor 52 and 57a of relay 57. Responsively to energization, reversing contactor 52 picks up and reverses the connections in the comparison circuit of main saturation control winding 37 so that it opposes the negative bias coil 36 and increases the output voltage of magnetic amplifier 27 in response to increasing current in the comparison circuit. Simultaneously, in response to energization, relay 57 picks up and opens its normally closed contacts 57b to deenergize and drop out the forward reversing contactor 11 for primary winding 5, and closes its normally open contacts 57c to energize and pick up reverse contactor 12. This connects the primary winding 5 to the source for reverse rotation so that the motor is now completely plugged with respect to both primary windings and exerts maximum braking torque which effectively counteracts the heavy wind load.

Limit switches (not shown) take the control away from the master switch at the nearly open and nearly seated positions of the leaf. The control is regained by moving the master switch to the off or first position in either direction.

Although in accordance with the provisions of the patent statutes, this invention is illustrated as embodied in concrete form and the principle thereof has been explained together with the best mode in which it is now contemplated. Applying that principle it will be understood that the apparatus shown and described is merely illustrative and that the invention is not limited thereto since alterations and modifications will readily suggest themselves to persons skilled in the art without departing from the true spirit of the invention or from the scope of the annexed claims.

What I claim as new and desire to secure by Letters Patent of the United States is:

1. A motor control system comprising in combination an induction motor having dual primary windings, current limiting means and reversing switching means connected in circuit with each of said windings, a master switching device and means controlled thereby for establishing a reference voltage representative of a desired speed of said motor, means for deriving from said motor a control voltage indicative of its speed, and means responsive to the difference of said voltages for controlling said current limiting means and said reversing switching means to conform the actual speed of said motor with said desired speed.

2. A motor control system comprising in combination an induction motor having dual primary windings, reversing switching means connected in circuit with each of said windings, a master switching device and means controlled thereby for establishing a reference voltage representative of a desired speed of said motor, means for deriving from said motor a control voltage indicative of its speed, and means responsive to the difference of said voltages for controlling said reversing switching means to control the relative directions of the torques produced by said primary windings.

3. A motor control system comprising in combination an induction motor having dual primary windings, current limiting means and reversing switching means connected in circuit with each of said windings, a master switching device and means controlled thereby for establishing a reference voltage representative of a desired speed of said motor, means for deriving from said motor a control voltage indicative of its speed, and means responsive to the difference of said voltages for jointly controlling said reversing switching means and current limiting means to control the relative directions and relative magnitudes of the torques produced by said primary windings.

4. A motor control system comprising in combination, an induction motor having dual primary windings, a separate series combination connected in circuit with each of said windings, each comprising a reversing switching means and a current limiting means, a master switching device for establishing a reference voltage representative of the desired speed of said motor, means for deriving from said motor and said reference voltage an error voltage indicative of the difference between a reference speed and the actual speed of said motor, means responsive to said error voltage for controlling said current limiting means to vary the relative torques produced by said primary windings comprising magnetic amplifier means having a saturation control winding and having its output connected to control said current limiting means and its saturation control winding connected to be responsive to said error voltage, reversing switching means for said saturation control windings, and means responsive to the output voltage of said magnetic amplifier means for jointly controlling said reversing switching means for said primary windings and said reversing switching means for said magnetic amplifier means.

5. In combination an induction motor having dual primary windings, a series combination connected in circuit with each of said windings comprising a reversing switchng means and a current limiting saturable reactor provided with a saturation control winding, a master switching device for varying the current limiting effect of said reactor, means for deriving from said motor and said master switching device an error voltage indicative of the difference between the speed of said motor and a reference speed established by said master switching device, and means responsive to said error voltage for selectively controlling the operation of said reversing switching means to control the relative directions of the torques produced by said primary windings.

6. In combination an induction motor having dual primary windings, a series combination connected in circuit with each of said windings comprising a reversing switching means and a current limiting saturable reactor provided with a saturation control winding, a master switching device, means for deriving from said motor and said master switch an error voltage indicative of the difference between a reference speed established by said master switch and the speed of said motor, and magnetic amplifier means responsive to said error voltage for selectively controlling the operation of said reversing switching means to control the relative directions of the torques of said primary windings and for varying the current limiting effects of said reactors to vary the magnitudes of said torques.

7. In combination an induction motor having dual primary windings, a series combination connected in circuit with each of said windings comprising a reversing switching means and a current limiting saturable reactor provided with a saturation control winding, a master switching device for providing a reference voltage representative of the desired speed of said motor, means for deriving from said motor a voltage representative of its speed, a voltage comparison-circuit for providing an error voltage representative of the difference of said reference voltage and said speed voltage, and magnetic amplifier means having a control winding included in said comparison circuit and having output windings connected to the saturation control windings of said reactors for controlling their current limiting effects to vary the torques of said primary windings, and means responsive to the output of said amplifiers for controlling the operation of said reversing switching means to control the relative directions of said torques.

8. A motor control system comprising in combination, an induction motor having dual primary windings, a series combination connected in circuit with each of said windings comprising a reversing switching means and a current limiting saturable reactor provided with a saturation control winding, a master switching device for providing a reference voltage representative of the desired speed of said motor, a tachometer generator driven by said motor for generating a voltage representative of its speed, a voltage-comparison circuit for providing an error voltage representative of the difference of said reference voltage and said speed voltage, and magnetic amplifier means having control windings included in said comparison circuit and having an output connected to the saturation control windings of said reactors for controlling their current limiting effects, and voltage-sensitive relay means responsive to the output of said amplifiers for controlling the operation of said reversing switching means to control the relative directions of the torques produced by said primary windings.

9. A motor control system comprising in combination, an induction motor having dual primary windings, a series combination connected in circuit with each of said windings comprising a reversing switching means and a current limiting saturable reactor provided with a saturation control winding, a master switching device for providing a reference voltage representative of the desired speed of said motor, means for deriving from said motor a voltage representative of its speed, a voltage-comparison circuit for providing an error voltage representative of the difference of said reference voltage and said speed voltage, a pair of magnetic amplifiers each having a bias winding and each having a control winding connected in series with the control winding of the other in said comparison circuit, and each having an output connected to the control winding of a different one of said reactors for controlling its current limiting effect, second reversing switching means for said control windings, and voltage-sensitive means responsive to the output voltage of said magnetic amplifiers for controlling said primary winding reversing switching means to control the relative directions of the torque produced by said primary windings and for controlling said second reversing switching means for controlling the relative magnitudes of said torques.

No references cited.